(12) United States Patent
Cieler et al.

(10) Patent No.: US 7,739,008 B2
(45) Date of Patent: Jun. 15, 2010

(54) REVERSING ASSISTANT

(75) Inventors: Stephan Cieler, Frankfurt (DE); Vera Donk, Babenhausen (DE); Guido Meier-Arendt, Langen (DE); Thomas Sulzbach, Offenbach (DE)

(73) Assignee: Siemens Aktiengesellschaft, Munich (DE)

( * ) Notice: Subject to any disclaimer, the term of this patent is extended or adjusted under 35 U.S.C. 154(b) by 1173 days.

(21) Appl. No.: 11/341,889

(22) Filed: Jan. 30, 2006

(65) Prior Publication Data
US 2006/0185921 A1 Aug. 24, 2006

(30) Foreign Application Priority Data
Jan. 31, 2005 (DE) .................. 10 2005 004 394

(51) Int. Cl.
*B60S 13/00* (2006.01)
(52) U.S. Cl. ....................... 701/36; 180/199
(58) Field of Classification Search ............... 701/36, 701/23–26, 41; 348/113, 118, 119, 143, 348/148, 207.99, 333.01, 333.02; 340/435–438, 340/901, 903, 932.2; 180/199, 204, 271; 700/61, 255
See application file for complete search history.

(56) References Cited

U.S. PATENT DOCUMENTS

| | | | |
|---|---|---|---|
| 5,742,141 A | 4/1998 | Czekaj | |
| 5,765,116 A | 6/1998 | Wilson-Jones et al. | |
| 6,285,279 B1 * | 9/2001 | Yamazaki | 340/432 |
| 6,778,891 B2 * | 8/2004 | Tanaka et al. | 701/41 |
| 6,919,917 B1 * | 7/2005 | Janssen | 348/143 |
| 6,999,602 B2 * | 2/2006 | Yoshida et al. | 382/104 |
| 7,304,651 B2 * | 12/2007 | Ishida et al. | 345/629 |
| 2003/0111278 A1 * | 6/2003 | Hauer et al. | 180/6.28 |
| 2004/0220724 A1 | 11/2004 | Hahn et al. | |

FOREIGN PATENT DOCUMENTS

| | | |
|---|---|---|
| DE | 198 09 416 A1 | 9/1999 |
| DE | 198 45 567 A1 | 4/2000 |
| DE | 100 06 682 A1 | 10/2001 |
| JP | 2003511288 A | 3/2003 |

OTHER PUBLICATIONS

German translation of Chinese Office Action dated Aug. 21, 2009.

* cited by examiner

*Primary Examiner*—Dalena Tran
(74) *Attorney, Agent, or Firm*—Laurence A. Greenberg; Werner H. Stemer; Ralph E. Locher

(57) ABSTRACT

The invention relates to a system in a vehicle for assisting a driver of a vehicle when reversing, having at least one sensor unit which detects objects within the surroundings to the rear of the vehicle, having a computing unit which is connected to the sensor unit and has the purpose of processing the detected objects, and having an actuator unit which is connected to the computing unit. According to the invention, the computing unit generates a virtual driving tube within which the vehicle can move backward without colliding with the detected objects. The actuator unit is a steering actuator which is actuated by the computing unit and has the purpose of outputting haptic information which informs the driver of the vehicle about the steering direction, which is to be adopted next for reverse travel within the driving tube.

15 Claims, 1 Drawing Sheet

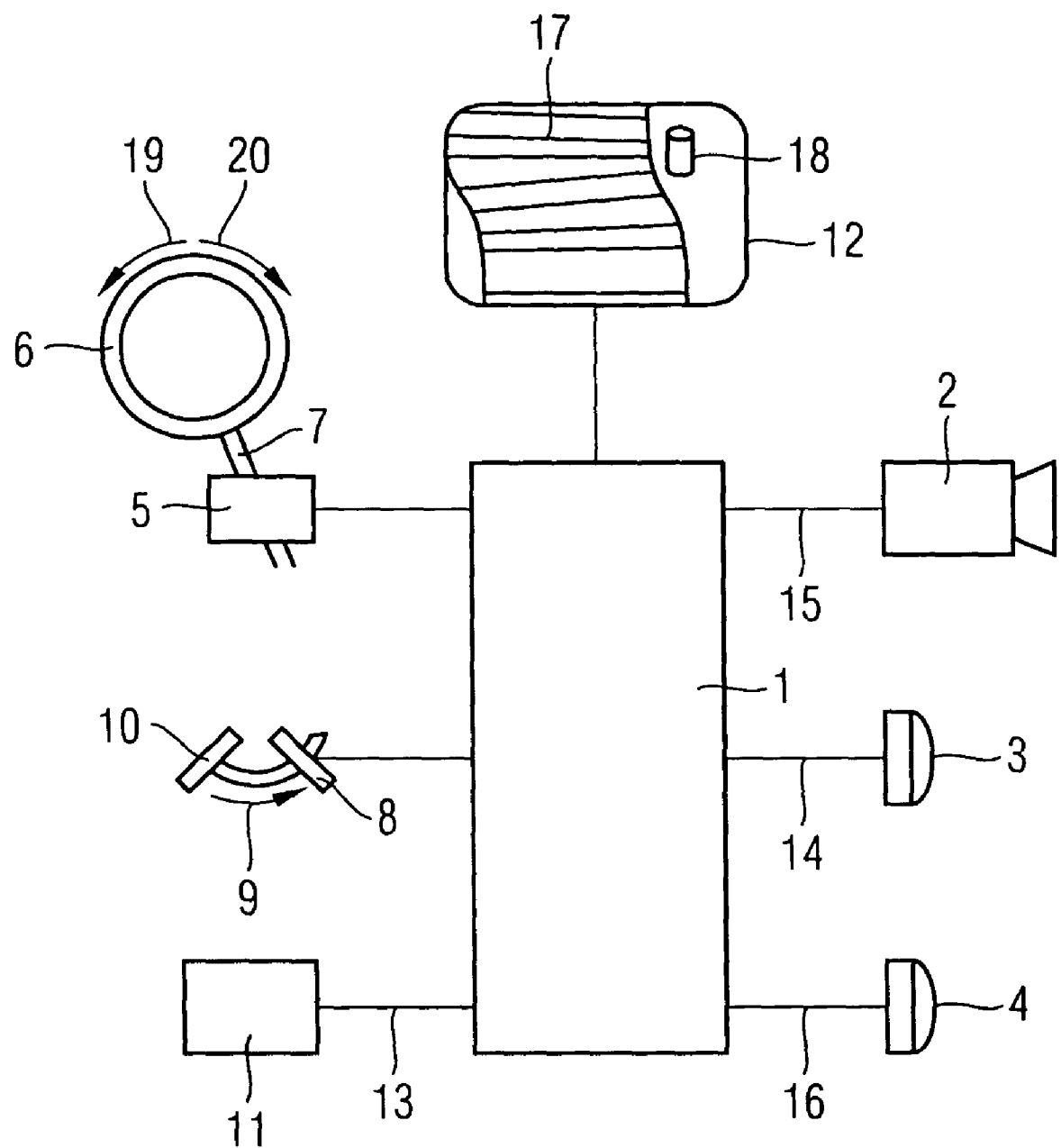

REVERSING ASSISTANT

CLAIM FOR PRIORITY

This application claims the benefit of priority to German Application No. 10 2005 004 394.1, filed in the German language on Jan. 31, 2005, the contents of which are hereby incorporated by reference.

TECHNICAL FIELD OF THE INVENTION

The invention relates to a system in a vehicle for assisting a driver of a vehicle when reversing.

BACKGROUND OF THE INVENTION

WO 98/00730 discloses a system for avoiding collisions when reversing. Objects located behind the vehicle are detected by means of an ultrasonic sensor or microwave sensor and the distance of the objects from the vehicle is determined. The distance is indicated acoustically and displayed in text form to the driver of the vehicle. If the distance becomes less than a predefined threshold value, a braking actuator is automatically activated in order to bring the vehicle to a stop in good time before a collision. In addition, a braking effect can be brought about by means of the engine. This system is used exclusively for avoiding collisions, that is to say it intervenes just before a collision with an object. Reversing per se is performed by the driver of the vehicle alone.

SUMMARY OF THE INVENTION

The invention relates to a system in a vehicle for assisting a driver of a vehicle when reversing, having at least one sensor unit which detects objects within the surroundings to the rear of the vehicle, having a computing unit which is connected to the sensor unit and has the purpose of processing the detected objects, and having an actuator unit which is connected to the computing unit.

The present invention discloses a system of the type mentioned at the beginning which assists the driver of a vehicle during the entire reversing process.

One embodiment of the invention is based on the fact that traveling in reverse requires increased awareness of the driver of the vehicle. For example, when the driver is using the exterior mirrors a reflected image of the surroundings behind the vehicle is viewed and this can lead to the right-hand and left-hand sides of the carriageway being interchanged and may correspondingly result in steering errors. A similar problem may occur when the upper body and head are turned back since in such a case a driving movement which is desired to the left in the viewing direction requires a steering lock to the right. Accordingly, selecting the correct steering direction has been recognized as being the main problem.

In order to support the driver of a vehicle in coping with this problem, the invention proposes generating, by means of the objects detected by the sensor unit, a virtual driving tube within which the vehicle can move backward without a collision. During the entire reverse travel, the driver of the vehicle is provided, by means of a steering actuator, with haptic information indicating the steering direction in which he must next move the steering wheel in order to move within the driving tube. In this context, the at least one sensor unit at the back of the vehicle preferably detects objects in the range of several centimeters to approximately 50 meters behind the vehicle.

Since the driver of the vehicle must inevitably grasp the steering wheel with his hands when reversing, the steering direction information is always reliably supplied to him in a haptic fashion without distracting him from his driving task. He is thus relieved of the need to select the correct steering direction so that he can concentrate completely on the fine correction of the movement of the vehicle. Steering maneuvers in the wrong direction and subsequent steering in the opposite direction are thus avoided, which smoothes out all of the driving behavior and makes the driving task easier for the driver of the vehicle. Increasing the driving comfort in turn leads to safer steering of the vehicle, as a result of which the number of accidents when reversing is reduced. The system according to the invention is also referred to below as a reversing assistant.

Haptic information is preferably provided in the form of the effect of a force on the steering wheel, it being possible for the force to act in the steering direction to be adopted or in the opposite direction to the steering direction, or in both directions. Such haptic information can be understood intuitively by the driver of the vehicle, i.e. he is not distracted from the events around the vehicle by the processing of otherwise customary visual or acoustic information. The effect of a force in the necessary steering direction should be smaller here than in the opposite direction to the steering direction since the latter acts as an opposing force against a steering force which is possibly applied incorrectly by the driver, while the force in the steering direction can only gently confirm and guide the driver without however leading to oversteering and thus to the selection of an excessively large steering angle which in turn would require steering corrections.

The force which is applied by the steering actuator is preferably selected to be smaller than the force which can be applied by the driver of the vehicle so that the reversing assistant can always be overridden by the driver of the vehicle.

In another embodiment of the invention, the haptic information is provided if a change in the steering angle currently adopted by the driver of the vehicle is necessary in order to remain within the driving tube. The driver of the vehicle therefore senses an assisting force or an opposing force only if the direction adopted by the vehicle clearly moves the vehicle in the direction of the edge of the driving tube. Within the driving tube the driver of the vehicle is given a free hand for maneuvering. This configuration stands, for example, in opposition to the vehicle being guided along an optimum route within the driving tube, on which route haptic information is constantly output to the driver, which information he could, under certain circumstances, feel to be too frequent and thus disruptive.

The computing unit preferably updates the virtual driving tube at constant time intervals during the reverse travel so that changes to the direction of movement and changes to the objects behind the vehicle are always taken into account on an updated basis.

In order to detect the surroundings of the vehicle in an optimum way, even at large steering lock angles, and to be able to adjust the driving tube quickly, in a further embodiment the at least one sensor unit detects not only the objects behind but also the objects located to the side next to the vehicle.

The use of a video camera, assisted by ultrasonic sensors for the close range, is preferred as at least one sensor unit. In this context, the video camera senses a comparable surrounding area to the human eye and particularly low objects and ones located near to the vehicle are detected by the ultrasonic sensors.

In another embodiment, the camera image can be used both for detecting objects and for avoiding the need for the driver of the vehicle to turn around. The need to turn the upper part of the body during reversing requires a certain degree of mobility which not all people have to a sufficient degree. For this reason, the image of the surroundings of the vehicle to the rear and/or to the side which are captured by the video camera has a graphic representation of the virtual driving tube calculated by the computing unit superimposed on it and is output on a display unit in the vehicle. For drivers of vehicles who have restricted mobility it is then possible to arrange the display unit in the cockpit area, eliminating the need to turn around, while other drivers of vehicles may possibly prefer the display unit to be mounted in the side or rear part of the passenger compartment of the vehicle since they find reversing with their field of vision directed straight ahead makes them uneasy.

The information about the steering direction to be adopted next can additionally be output to the driver of the vehicle by means of an acoustic output unit and/or a visual output unit, this configuration being appropriate particularly in conjunction with the presentation of the image of the driving tube and of the surroundings of the vehicle. The driver of the vehicle sits in the direction which is also usual for straight-ahead travel and can implement steering direction information directly, while if a driver of a vehicle is looking to the rear there is again the risk that he will mix up the steering direction which is displayed or announced as being the "right-hand" direction or "left-hand" direction.

In a further embodiment of the invention, there is a computing unit to detect the risk of the vehicle leaving the driving tube, and cause a warning to be output to the driver of the vehicle. This is appropriate, in particular, if the driver of the vehicle overrides the reversing assistant with false steering inputs. Since the driving tube is calculated as a collision-free driving space, the vehicle leaving the driving tube corresponds to the risk of a collision with a detected object. As a warning against such a collision it is possible to output a warning tone and/or a visual display, for example one or more LEDs, can be actuated.

In still another embodiment, the warning is generated by means of an actuator at the accelerator pedal in that an opposing force which counteracts activation of the accelerator pedal is built up at the accelerator pedal. The driver is thus prompted to reduce the driving speed and also the opposing force makes him aware of the risk. This embodiment provides the advantage, as does the haptic information via the steering wheel, that there is no need for the passenger compartment of the vehicle to be provided with any additional information devices which require the driver's attention. The accelerator pedal is inevitably activated by the driver during reverse travel and thus serves at the same time as a warning device. The warning information can be perceived intuitively, as can the steering direction information, without distracting the driver from the driving activity.

It is also advantageous if the reversing assistant is activated automatically when the reverse gear of the vehicle is engaged. Manual activation by the driver, and thus an additional operator control knob or operator control process, are therefore eliminated.

In yet another embodiment, the surface of the steering wheel is of touch-sensitive design, and the reversing assistant automatically switches off when the driver of the vehicle does not have a hand on the steering wheel. This provides additional safety since an effect of a force acting on the steering wheel, which is conceived of as haptic information, when there is no steering force applied by the driver can lead to undesired adjustment of the steering wheel. However, the reversing assistant is conceived of exclusively as a supporting system, and not as an automatically acting system.

BRIEF DESCRIPTION OF THE DRAWINGS

The invention will be explained in more detail below with reference to an exemplary embodiment and the drawing.

FIG. 1 shows a reversing assistant of a motor vehicle in accordance with the invention.

DETAILED DESCRIPTION OF THE INVENTION

FIG. 1 illustrates a reversing assistant of a motor vehicle, composed of a computing unit 1 which is connected to a video camera 2, an ultrasonic sensor 3, a radar sensor 4, a steering actuator 5 which can exert a force effect on a steering column 7 which is connected to a steering wheel 6, an accelerator pedal actuator 8 which can apply an opposing force in the opposite direction to the activation direction 9 of an accelerator pedal 10, a transmission unit 11 and a VDU 12.

The transmission unit 11 detects engagement of the reverse gear of the vehicle and transmits corresponding information 13 to the computing unit 1, causing the reversing assistant to be activated. The ultrasonic sensor 3 then detects objects 14 in the close range behind the motor vehicle and transmits them to the computing unit 1. The video camera 2 transmits, as video information 15, both the video image itself and objects detected therein in the medium distance range. And objects 16 in the long range are detected with the radar sensor 4 and transmitted to the computing unit 1. From the objects 14, 15 and 16, the computing unit 1 generates a virtual driving tube within which the motor vehicle can move without collision. This driving tube 17 is superimposed on the video image on which an object 18 can be seen, and said video image is displayed on the VDU 12. As is apparent from the profile of the driving tube 17, the driver of the vehicle must subsequently lock the steering wheel to the left in order to avoid the object 18. Correspondingly, the computing unit 1 actuates the steering actuator 5 in such a way that a small guiding force is built up in the steering direction 19, while an opposing force which is larger than the guiding force acts in the steering direction 20. If the driver of the vehicle happens not to comply with this haptic information and carries on driving straight ahead, the computing unit 1 detects the risk of the vehicle leaving the driving tube 17 in the direction of the object 18 and causes the accelerator pedal actuator 8 to build up a force in the opposite direction to the direction 9 of the accelerator pedal 10.

The invention claimed is:

1. A system in a vehicle for assisting a driver of a vehicle when reversing, comprising:
   at least one sensor unit which detects objects within surroundings to a rear of the vehicle;
   a computing unit which is connected to the sensor unit and processes the detected objects; and
   an actuator unit which is connected to the computing unit, wherein the computing unit generates a virtual driving tube within which the vehicle can move backward without colliding with the detected objects, and the actuator unit is a steering actuator which is actuated by the computing unit and outputs haptic information which informs the driver of the vehicle about a steering direction, which is to be adopted next for reverse travel within the driving tube;

wherein the steering actuator provides the haptic information to a steering wheel as a force in the steering direction to be adopted when the vehicle will remain within the virtual driving tube if the steering direction is adopted; and wherein the steering actuator provides the haptic information to the steering wheel as a force in an opposite direction to the steering direction to be adopted when there is a risk that the vehicle will leave the virtual driving tube if the steering direction is adopted.

2. The system as claimed in claim 1, wherein the effect of the force is smaller than the steering force which can be applied by the driver of the vehicle.

3. The system as claimed in claim 1, wherein the haptic information is provided if a change in the steering angle currently adopted by the driver of the vehicle is necessary to remain within the driving tube.

4. The system as claimed in claim 1, wherein the computing unit updates the driving tube at constant time intervals during the reverse travel.

5. The system as claimed in claim 1, wherein the at least one sensor unit detects objects which are located in the surroundings of the vehicle to the side.

6. The system as claimed in claim 1, wherein the at least one sensor unit is a video camera.

7. The system as claimed in claim 6, wherein the image of the surroundings of the vehicle to the rear and/or to the side which are captured by the video camera has a graphic representation of the virtual driving tube superimposed on it and is output on a display unit in the vehicle.

8. The system as claimed in claim 1, wherein the at least one sensor unit is an ultrasonic sensor.

9. The system as claimed in claim 1, wherein the information about the steering direction to be adopted next is additionally provided to the driver of the vehicle by means of an acoustic output unit and/or a visual output unit.

10. The system as claimed in claim 1, wherein the computing unit detects a risk of the vehicle leaving the driving tube and causes a warning to be output to the driver of the vehicle.

11. The system as claimed in claim 10, further comprising:

an accelerator pedal actuator;

said computing unit detecting a risk that the vehicle will leave the driving tube when the driver ignores the haptic information; and in response to the risk that has been detected, said computing unit causing said accelerator pedal actuator to apply a force to an accelerator pedal that opposes an activation of the accelerator pedal in order to output a warning to the driver of the vehicle.

12. The system as claimed claim 10, wherein a warning is issued to the driver of the vehicle by means of an acoustic and/or visual output unit.

13. The system as claimed in claim 1, wherein the system is activated automatically when the reverse gear of the vehicle is engaged.

14. The system as claimed in claim 1, wherein a surface of the steering wheel is of touch-sensitive design, and the system automatically switches off when the driver of the vehicle does not have a hand on the steering wheel.

15. The system as claimed in claim 1, wherein a surface of the steering wheel is of touch-sensitive design, and the system automatically switches off when the driver of the vehicle does not have a hand on the steering wheel so that the haptic information is no longer applied to the steering wheel.

* * * * *